(12) United States Patent
Brent et al.

(10) Patent No.: US 7,082,125 B1
(45) Date of Patent: Jul. 25, 2006

(54) COMMUNICATION MODEL FOR LINECARD MODEMS

(75) Inventors: Jason B. Brent, Foothill Ranch, CA (US); Thomas C. Liau, Irvine, CA (US)

(73) Assignee: Mindspeed Technologies, Inc., Newport Beach, CA (US)

(*) Notice: Subject to any disclaimer, the term of this patent is extended or adjusted under 35 U.S.C. 154(b) by 970 days.

(21) Appl. No.: 09/990,059

(22) Filed: Nov. 20, 2001

Related U.S. Application Data

(60) Provisional application No. 60/322,936, filed on Sep. 17, 2001.

(51) Int. Cl.
*H04L 12/50* (2006.01)

(52) U.S. Cl. .............. 370/359; 370/463; 370/420; 379/166

(58) Field of Classification Search ........... 379/93.08, 379/93.09, 166, 993.01; 370/420, 463, 419, 370/359; 375/222
See application file for complete search history.

(56) References Cited

U.S. PATENT DOCUMENTS

| | | | |
|---|---|---|---|
| 5,889,856 A | | 3/1999 | O'Toole et al. |
| 5,959,996 A | * | 9/1999 | Byers .................. 370/401 |
| 6,035,020 A | | 3/2000 | Weinstein et al. |
| 6,072,794 A | | 6/2000 | Kang |
| 6,075,776 A | | 6/2000 | Tanimoto et al. |
| 6,128,300 A | * | 10/2000 | Horton .................. 370/395.65 |
| 6,195,414 B1 | | 2/2001 | Simmons et al. |
| 6,212,228 B1 | | 4/2001 | Vlajnic |
| 6,215,863 B1 | | 4/2001 | Bennett, III et al. |
| 6,229,814 B1 | | 5/2001 | McMillan et al. |
| 6,229,846 B1 | | 5/2001 | Lassig et al. |
| 6,396,911 B1 | | 5/2002 | Kostan et al. |
| 6,400,769 B1 | * | 6/2002 | Gatherer et al. ............. 375/241 |
| 6,411,618 B1 | * | 6/2002 | Quiring et al. ............. 370/359 |
| 6,498,806 B1 | | 12/2002 | Davis |
| 6,574,280 B1 | * | 6/2003 | Liau et al. ................ 375/242 |
| 6,751,304 B1 | * | 6/2004 | Edmon et al. ............ 379/93.32 |
| 6,785,340 B1 | | 8/2004 | Stockman et al. |
| 6,954,463 B1 | | 10/2005 | Ma et al. |

* cited by examiner

*Primary Examiner*—Doris H. To
*Assistant Examiner*—Steve Blount
(74) *Attorney, Agent, or Firm*—Farjami & Farjami LLP

(57) ABSTRACT

A communication system is provided for transferring data through a digital switching network. The communication system includes a client modem, a linecard in communication with the client modem over a local loop, and a linecard modem interfacing with the linecard and the digital switching network. The client modem modulates client data to generate modulated client data for transmission to the linecard over the local loop, and the linecard modem receives the modulated client data from the linecard and demodulates the modulated client data to generate the client data for transmission through the digital switching network. Further, the linecard modem modulates network data from the digital switching network to generate modulated network data for transmission to the client modem over the local loop, and the client modem receives and demodulates the modulated network data to generate the network data.

33 Claims, 3 Drawing Sheets

US 7,082,125 B1

COMMUNICATION MODEL FOR LINECARD MODEMS

RELATED APPLICATIONS

The present application claims the benefit of U.S. provisional application Ser. No. 60/322,936, filed Sep. 17, 2001, which is hereby fully incorporated by reference in the present application.

BACKGROUND OF THE INVENTION

1. Field of the Invention

The present invention generally relates to modem communications and, more particularly, to systems and methods for increasing speed and improving performance of modems.

2. Related Art

As the popularity of the Internet continues to increase, consumers and Internet Service Providers (ISPs) seek new methods and systems for providing data at a higher throughput in a way that requires minimal expense and retrofitting at the subscriber's premises. The need for transferring data at higher rates has been intensifying day by day due to the increased use of the Internet to transfer image files, video files and the like files, which contain a great amount of data. Such need has caused many users to transition away from traditional voiceband analog modems, with a top data rate of about 56,000 bits-per-second (bps) downstream and about 33,000 bps upstream, to more expensive broadband alternatives such as DSL modems, cable modems, T1 or T3 lines. However, it is well known that such alternatives suffer from many drawbacks when compared to analog modems. For example, (1) such alternatives are not versatile and unlike analog modems may not be simply plugged into any phone line that can support voice and all legacy voiceband modem and fax services, (2) DSL and cable services may not be available in many locations, (3) such alternatives need retrofits at both central site and the client premises, and (4) such alternatives are considerably more expensive and take more time to be set up.

On the other hand, modems are less expensive, more versatile and take less time to be set up and placed in use, because they take advantage of the existing telephony infrastructure provided by copper wire pairs and linecards, which are used to provide telephony services. Copper wire pairs are also referred to as a loop and essentially extend from a customer's premises and terminate at a linecard in a telephone company central office. Line cards and associated line card shelf circuitry at the central office are used to transmit signals on copper wires and to link copper wires to central office switching equipment.

FIG. 1 illustrates a conventional communication system or model 100 using traditional analog modems (e.g., modems configured in accordance with V.34, V.90 or V.92 standards). As shown, communication system 100 includes client side modem 110 for use by an end-user, such as a modem in a personal computer at home or office. Client side modem 110 receives user data 105 in digital form from the personal computer (not shown) and converts user data 102 to analog form (modulated data) for transmission as analog signal 112 over the local loop to the central office. In addition, client side modem 110 receives analog signal 115 over the local loop from the central office and converts analog signal 115 to digital form and transmits user data 105 to the personal computer. As discussed above, the local loop carrying analog signals 112 and 115 terminates at linecard 120 located at the central office. For example, linecard 120 receives analog signal 112 from client side modem 110 and provides A/μ-law digitized analog signal 122 to central site modem 140 over digital switching network 130, and further receives A/μ-law digitized analog signal 125 from central site modem 140 and provides analog signal 115 to client side modem 110.

As shown in FIG. 1, A/μ-law digitized analog signal 122 is transmitted over digital switching network 130 and received as A/μ-law digitized analog signal 132 by central site modem 140, which converts A/μ-law digitized analog signal 132 to user data 142 in digital form (or demodulated data) for use by a remote device, such as Internet Service Provider ("ISP") 150. Similarly, ISP 150 transmits user data 145 in digital form to central site modem 140 for conversion to A/μ-law digitized analog signal 135 and transmission over digital switching network 130, which signal is received by linecard 120 as A/μ-law digitized analog signal 125 and provided to client side modem 110 over the local loop as analog signal 115 for conversion to user data 105 and use by the computer or terminal at the client premises.

It is the conversion to A/μ-law PCM at 8 kHz sample rate that generally is the main impairment that limits the data rates, which imposes a theoretical maximum connection speed of 64 kbps and a practical limit of below 56 kbps, as provided by traditional modems supporting V.92/V.90 modulation. Furthermore, such modems must determine and compensate for digital network impairments, far end echo, send answer tone to turn off echo suppressor and echo canceler existing in communication system 100. In addition, traditional modems must always dial a phone number prior to establishing a connection, which requires long training period to achieve.

Moreover, a commercially available broadband alternative, such as DSL, also falls short of being a complete solution. For example, DSL is defined primarily to achieve very much higher speeds of up to several mega bits per second, and uses less complex modulation schemes to aid hardware implementation of the highest available speeds. As a result, DSL service is not available on many lines that can support a substantially higher data rate than 56 kbps, but cannot support the lowest provided speeds of current DSL technology.

Accordingly, there in an intense need to provide a new and revolutionary communication model, which provides substantially higher data rates for modems and eliminates current limitations and impairments in today's modem communication systems. There is also a long-felt need for new communication models using existing copper wire infrastructure, with minimal upgrade, which can provide data rates commensurate with existing digital lines and that can eliminate the need for time consuming and expensive installations of new infrastructure for T1, T3 and DSL lines.

SUMMARY OF THE INVENTION

In accordance with the purpose of the present invention as broadly described herein, there is provided system and method for utilizing a linecard modem. In one aspect of the present invention, a communication system is provided for transferring data through a digital switching network. The communication system includes a client modem, a linecard in communication with the client modem over a local loop, and a linecard modem interfacing with the linecard and the digital switching network. According to this aspect of the invention, the client modem modulates client data to generate modulated client data for transmission to the linecard over the local loop, and the linecard modem receives the modulated client data from the linecard and demodulates the modulated client data to generate the client data for transmission through the digital switching network.

In a further aspect, the linecard modem modulates network data from the digital switching network to generate modulated network data for transmission to the client modem over the local loop, and the client modem receives and demodulates the modulated network data to generate the network data. In some aspects, the linecard modem is a component of the linecard. Furthermore, the linecard modem is capable of supporting data rates of about 64 kbps, 128 kbps and other multiples of 64 kbps. In one aspect, the linecard modem and the client modem connect at a speed equal or less than a maximum network speed determined by the linecard modem.

According to a separate aspect of the present invention, a communication method is provided for use with a linecard terminating a local loop in communication with a client modem, where the linecard interfaces with a linecard modem in commination with a digital switching network. The communication method includes: detecting the local loop to be in an off-hook state by the linecard, transmitting a dial tone by the linecard, transmitting a linecard indication indicative of existence of the linecard modem, receiving a client indication indicative of existence of the client modem, establishing a connection to the client modem by the line card modem, receiving modulated client data over the local loop by the linecard modem from the client modem, demodulating the modulated client data to generate client data by the linecard modem, and transmitting the client data through the digital switching network.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein. It should be appreciated that the particular implementations shown and described herein are merely exemplary and are not intended to limit the scope of the present invention in any way.

Figure 2:
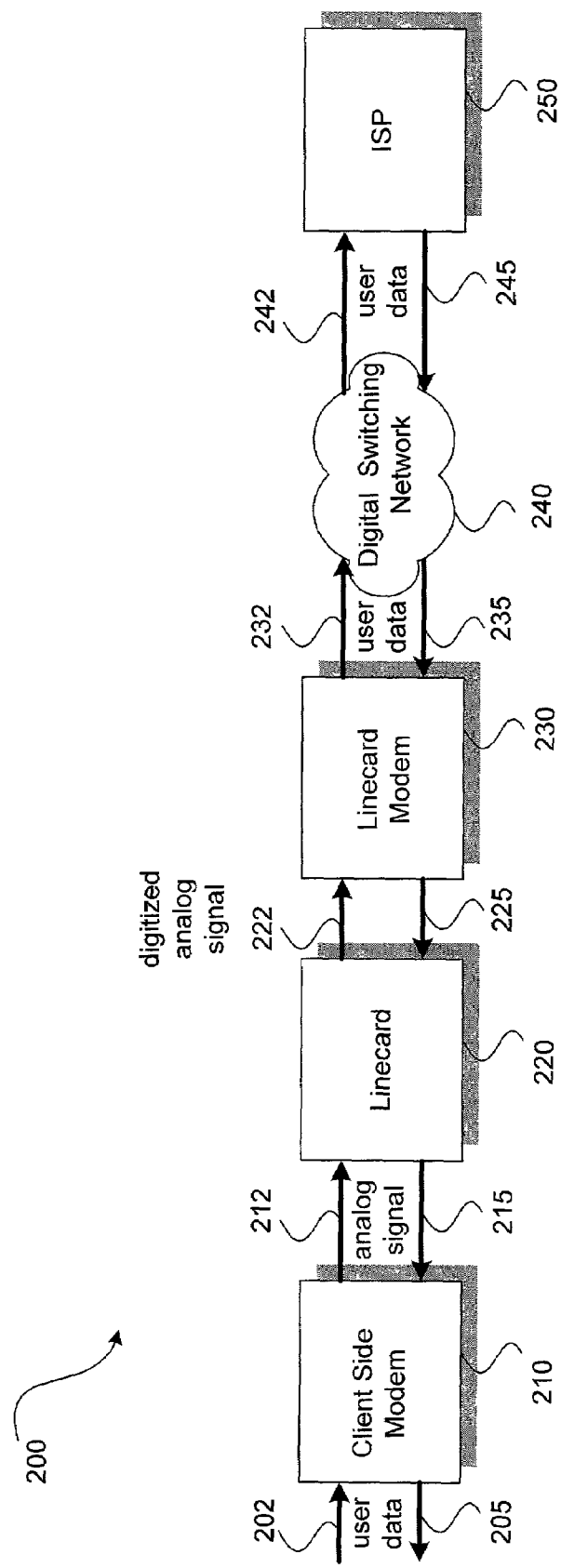
FIG. 2 illustrates a communication system or model according to one embodiment of the present invention.

FIG. 2 illustrates communication system or model 200 according to one embodiment of the present invention. As shown, communication system 200 includes client side modem 210 for use by an end-user, such as a modem in a personal computer at home or office. Client side modem 210 receives user data 202 in digital form from the personal computer (not shown) and converts user data 202 to analog form (or modulated data) for transmission as analog signal 212 over the local loop to the central office. In addition, client side modem 210 receives analog signal 215 over the local loop from the central office and converts analog signal 215 to digital form (or demodulated data) and transmits user data 205 to the personal computer.

As explained above, the local loop carrying analog signals 212 and 215 terminates at linecard 220 located at the central office. According to one embodiment of the present invention, linecard 220 interfaces with linecard modem 230. In one embodiment, linecard modem 230 may be placed on linecard 220 or is a component of linecard 220. In another embodiment, linecard modem 230 may be at the central office in close vicinity of linecard 220. In any event, linecard 220 analog to digital conversion module receives analog signal 212 from client side modem 210 and provides digitized analog signal 222 to linecard modem 230, and linecard 220 digital to analog conversion module further receives digitized analog signal 225 from linecard modem 230 and provides analog signal 215 to client side modem 210. In a preferred embodiment, the format for the digitized analog samples is linear/uniform spacing rather than A/µ-law PCM for reduced receiver noise.

In other words, linecard modem 230 is placed at the edge of the network, i.e. copper wires termination equipment, to transfer user data 232 and 235 in digital form (or demodulated data) over digital switching network 240. As shown in FIG. 2, user data 232 in digital form is transmitted over digital switching network 240 and received as user data 242 in digital form by a remote device, such as ISP 250. Similarly, ISP 250 transmits user data 245 in digital form over digital switching network 240, which is received as user data 235 in digital form by linecard modem 230.

By placing linecard modem 230 at the edge of the network to enable transfer of user data 232 and 235 in digital form over digital switching network 240, the present invention eliminates major telephone line impairments of the conventional communication systems, such as communication system 100, and bypasses limitations and impairments caused by G.711 A/µ-law PCM compression with 4 kHz band limiting (i.e. 8 kHz sample rate). As a result, modems implemented for use in communication system 200 may break through the 64 kbps data rate limit of V.90/V.92 channel model and achieve higher data rates that can only be limited by the maximum bandwidth and noise levels of the telephone line and the maximum capacity of the digital line access to digital switching network 240, but which is not limited by the voiceband analog to digital conversion.

Figure 3:
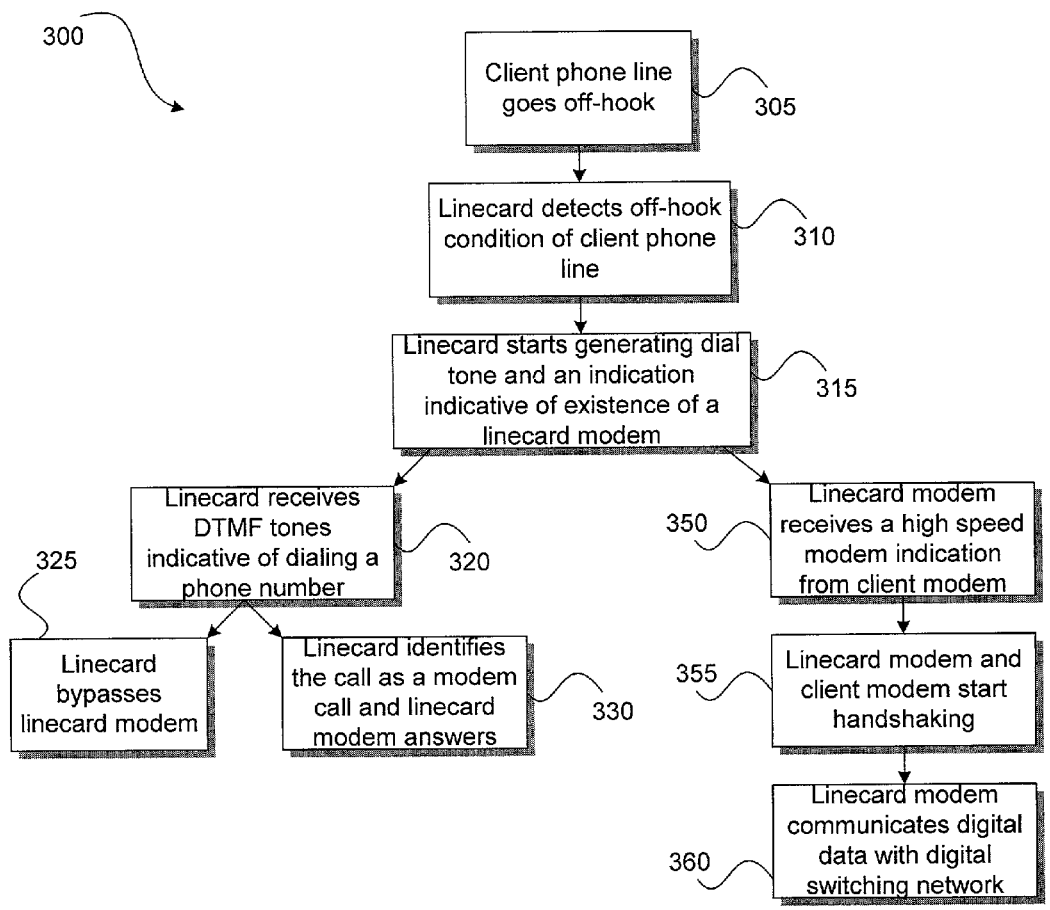
FIG. 3 illustrates an exemplary flow diagram of a communication method utilizing the communication system of FIG. 2.

Turning to FIG. 3, linecard modem process 300 starts at step 305, where the telephone line at the client side goes off-hook, for example, by picking up a telephone or taking client side modem 210 off-hook. Next, in step 310, linecard 220 detects the off-hook condition of the telephone line. In response, at step 315, linecard 220 starts generating a dial tone and linecard 220 transmits a modem indication, over the telephone line, indicative of the existence of linecard modem 230. Preferably, the modem indication is of a form that is transparent to the user or other existing telephone devices. For example, in one embodiment, the modem indication is a tone above 4 kHz in frequency, such that the tone is not audible to the user, but still detectable by client side modem 210. In some embodiments, however, at step 315, client side modem 210 may provide an indication by transmitting tones or signals on the line, to indicate existence of a client side modem that is capable of communicating with linecard modem 230.

Figure 1:
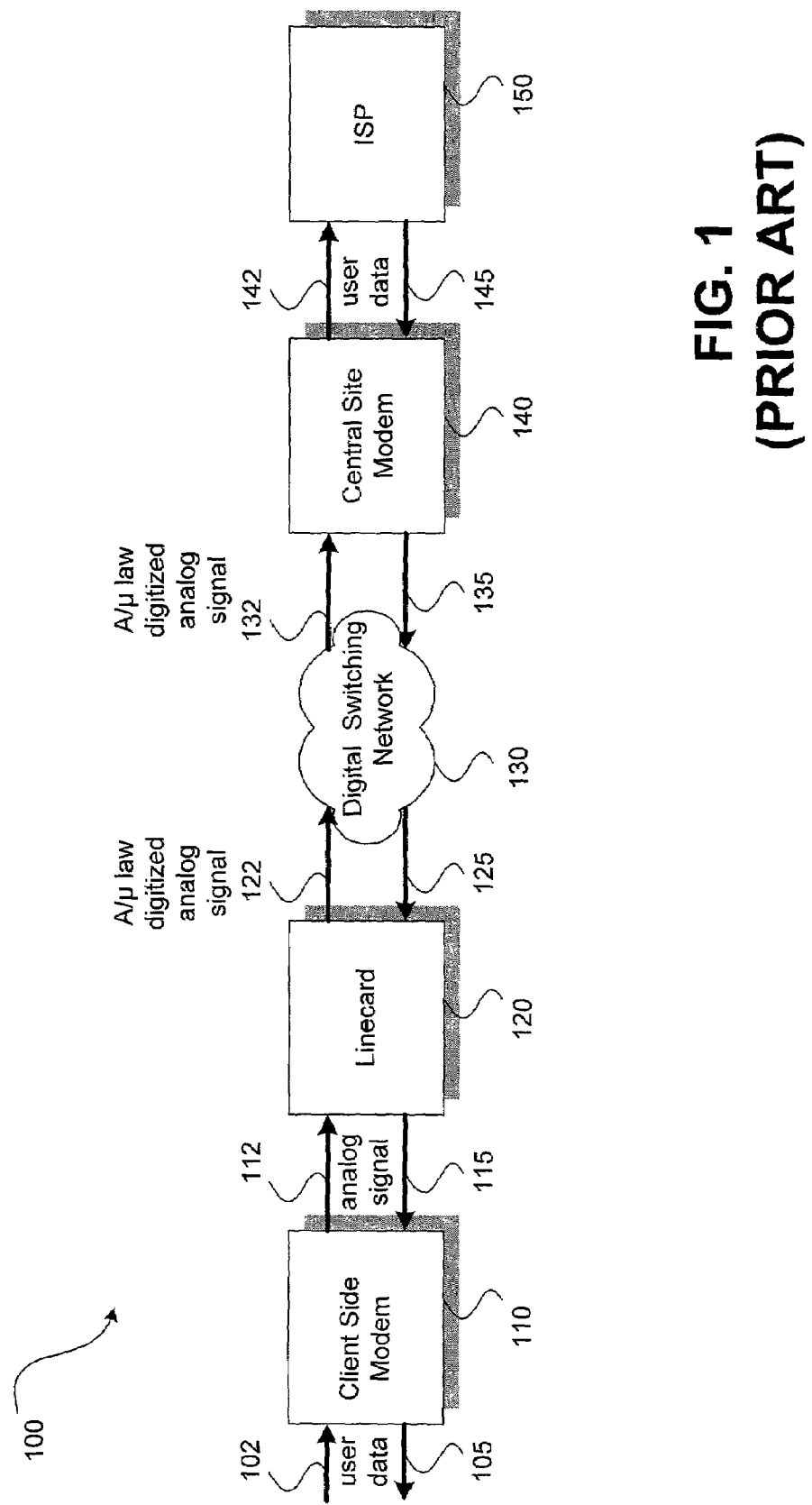
FIG. 1 illustrates a prior art communication system or model.

At this stage, if the telephone line has been taken off-hook by a user or a client side modem that is incapable of supporting high speed capabilities of linecard modem 230, at step 320, linecard 220 and/or a switch receives DTMF tones indicative of dialing of a phone number by the user or client side modem 210. In response, process 300 may move to step 325 such that linecard 220 bypasses linecard modem 230 and proceeds with the telephone call according to conventional methods in use today. On the other hand, process 300 may move to step 330 if linecard 220 is capable of determining that the telephone call is a modem call. For example, linecard 220 may determine that the dialed telephone number is a modem call by analyzing the dialed telephone number, e.g., the prefix, additional DTMF tones, etc. Upon determining that the dialed telephone number is a modem call, linecard modem 230 answers the incoming call by emulating the operation of conventional modems including various communications modes, such as V.92, V.90, V.34, V.32, V.22bis, V.21, etc., or by reverting to standard A/µ-law PCM companding so the signals can be passed through the digital switching network 130 to central site modem 140 according to communication system of FIG. 1. Accordingly, the digital to analog conversion functions of linecard modem 230 are capable of switching between standard A/µ-law PCM mode and high-speed modem mode (for example, including higher sample rate, uniform spacing, etc.), such as the system described in U.S. Pat. No. 6,285, 672, entitled "Method and System for Achieving Improved Data Transmission Through the Public Switched Telephone Network", which is hereby incorporated by reference.

Turning back to step 315, if the telephone line has gone off-hook by a client side modem capable of supporting high speed capabilities of linecard modem 230, process 300 moves to step 350. At step 350, client side modem 210 generates a response or indication to linecard modem 230 by transmitting a tone identifying client side modem 210 as a high speed modem. Next, at step 355, client side modem 210 and linecard modem 230 initiate the handshaking process to establish a connection, at step 360, linecard modem 230 makes it possible for client side modem 210 to transmit data in digital form over digital switching network 240.

It should be noted that the handshaking process may be performed substantially faster that the conventional handshaking process between existing modems, because many of the communication channel limitations, impairments or concerns of conventional modems do not exist for linecard modems. For example, there is no need for client side modem 210 to transmit an answer tone, since the answer tone is primarily used to turn off echo suppressor and echo canceler in the network. Also, there is no concern about far end echo, since linecard modem 230 is placed at the edge of the network. As a result, based on communication model 200, client side modem 210 and linecard modem 230 may train much faster. Furthermore, subsequent trainings may further be speeded up by restoring parameter values for equalizer and echo canceler calculated at the time of first training. It should be noted, however, that the connection between linecard modem 230 and client side modem 210 may also be considered as an "always-on" connection similar to T1, ISDN or DSL connection.

Furthermore, because linecard modem 230 is in communication with digital switching network 240, linecard modem 230 may receive information regarding capabilities of digital switching network 240 and adjust its connection speed according to the maximum speed supported by digital switching network 240. For example, if digital switching network 240 includes a bottleneck such that data cannot be transferred at a rate faster than 64 kbps, linecard modem 230 will not negotiate any data rate faster than 64 kbps. As a result, the connection between linecard modem 230 and client side modem 210 would be a more robust connection (with a quick train-up time and the same effective speed), than when linecard modem 230 and client side modem 210 connect at higher speeds, which would be subject to the bottleneck speed.

Linecard modem 230 may support various speeds given the adequate telephone bandwidth and digital line access to digital switching network 240. For example, in one embodiment, linecard modem 230 may be a 64 kbps linecard modem ("LC64"), which can support speeds of up to 64 kbps at various increments, such as 2400 bps, and can replace the existing linecards with minimal or no hardware or software changes to the digital switching hardware. Such embodiment may be implemented by a simple upgrade of the existing linecards. In another embodiment, linecard modem 230 may be a 128 kbps linecard modem ("LC128"), which can support speeds of up to 128 kbps at various increments, such as 2400 bps, and can replace existing ISDN linecards with minimal changes to the digital switching hardware. In other embodiments, linecard modem 230 may be any multiple 64 kbps linecard modem ("LCnx64"), which can support mega-bite speeds at various increments, such as 2400 bps, and can support access to any digital network that is configured to support high speed digital data, such as T1, fractional T1, T3 and various DSL flavors.

Accordingly, the present invention provides a communication system that is capable of bridging the gap between the traditional analog modems and the existing broadband modems, such as DSL modems. Various embodiments of the present invention are capable of supporting data rates in excess of 64 kbps on communication lines that cannot support DSL connections. In addition, various embodiments can be placed in use on existing telephone lines without any modifications to the existing infrastructure. Furthermore, communication systems of the present invention, unlike existing broadband systems, do not require the use of analog splitters. Also, by maximizing the data rate while minimizing the use of analog bandwidth, crosstalk levels can be reduced relative to existing DSL schemes. These and other advantages of the present invention can be attained by implementing different flavors of linecard modems described above, while still supporting all existing voice and voiceband modem services.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A communication system for transferring data through a digital switching network, said communication system comprising:
   a client modem;
   a linecard in communication with said client modem over a local loop; and
   a linecard modem interfacing with said linecard and said digital switching network;
   wherein said linecard generates a dial tone and a linecard indication indicative of existence of said linecard modem in response to said linecard detecting said client modem being in an off-hook state;
   wherein said client modem modulates client data to generate modulated client data for transmission to said linecard over said local loop, and wherein said linecard modem receives said modulated client data from said linecard and demodulates said modulated client data to generate said client data for transmission through said digital switching network.

2. The communication system of claim 1, wherein said linecard modem modulates network data from said digital switching network to generate modulated network data for transmission to said client modem over said local loop, and wherein said client modem receives and demodulates said modulated network data to generate said network data.

3. The communication system of claim 1, wherein said linecard modem is a component of said linecard.

4. The communication system of claim 1, wherein said linecard modem supports a maximum data rate of about 64 kbps.

5. The communication system of claim 1, wherein said linecard modem supports a maximum data rate of about 128 kbps.

6. The communication system of claim 1, wherein said linecard modem and said client modem connect at a speed equal or less than a maximum network speed determined by said linecard modem.

7. The communication system of claim 1, wherein said client modem transmits a client indication indicative of existence of said client modem in response to said linecard indication, and wherein said client modem and said linecard modem start handshaking without said client modem dialing a number.

8. The communication system of claim 7, wherein said linecard modem does not generate an answer tone for said handshaking.

9. The communication system of claim 1, wherein said client modem dials a number in response to said dial tone, and wherein said linecard identifies said number as a modem call and configures said linecard modem to start handshaking with said client modem without generating an answer tone.

10. A linecard for terminating a local loop used for communication of data between a client modem and a digital switching network, said linecard comprising:
    an interface circuitry for terminating said local loop; and
    a linecard modem interfacing with said interface circuitry;
    wherein said linecard generates a dial tone and a linecard indication indicative of existence of said linecard modem in response to said linecard detecting said client modem being in an off-hook state;
    wherein said linecard modem receives modulated client data from said client modem over said local loop, and wherein said linecard modem demodulates said modulated client data to generate said client data for transmission through said digital switching network.

11. The linecard of claim 10, wherein said linecard modem modulates network data to generate modulated network data for transmission to said client modem over said local loop.

12. The communication system of claim 10, wherein said linecard modem supports a maximum data rate of about 64 Kbps.

13. The communication system of claim 10, wherein said linecard modem supports a maximum data rate of about 128 Kbps.

14. The communication system of claim 10, wherein said linecard modem supports one or more data rates multiple of 64 Kbps.

15. The communication system of claim 10, wherein said linecard modem and said client modem connect at a speed equal or less than a maximum network speed determined by said linecard modem.

16. The communication system of claim 10, wherein said linecard modem and client modem support V.92, V.90 or V.34 compatible modulation.

17. The linecard of claim 10, wherein said linecard receives a client indication from said client modem indicative of existence of said client modem in response to said linecard indication, and wherein said linecard modem starts handshaking with said client modem without said linecard receiving tones indicative of said client modem dialing a number.

18. The linecard of claim 17, wherein said linecard modem does not generate an answer tone for said handshaking.

19. The linecard of claim 10, wherein said linecard receives tones indicative of said client modem dialing a number in response to said dial tone, and wherein said linecard identifies said number as a modem call and configures said linecard modem to start handshaking with said client modem without generating an answer tone.

20. A communication method for use with a linecard terminating a local loop in communication with a client modem, said linecard interfacing with a linecard modem in commination with a digital switching network, said communication method comprising:
    detecting said local loop to be in an off-hook state by said linecard;
    transmitting a dial tone by said linecard in response to said detecting;
    transmitting a linecard indication indicative of existence of said linecard modem;
    establishing a connection to said client modem by said line card modem;
    receiving modulated client data over said local loop by said linecard modem from said client modem;
    demodulating said modulated client data to generate client data by said linecard modem; and
    transmitting said client data through said digital switching network.

21. The communication method of claim 20 further comprising:
    receiving network data by said linecard modem from said digital switching network;
    modulating said network data to generate modulated network data by said linecard modem; and transmitting said modulated network data to said client modem.

22. The communication method of claim 20, wherein said linecard modem is a component of said linecard.

23. The communication method of claim 20, wherein said linecard modem supports a maximum data rate of about 64 kbps.

24. The communication method of claim 20, wherein said linecard modem supports a maximum data rate of about 128 kbps.

25. The communication method of claim 20, wherein said linecard modem supports one or more data rates multiple of 64 kbps.

26. The communication method of claim 20, wherein said linecard modem and said client modem connect at a speed equal or less than a maximum network speed determined by said linecard modem.

27. The communication method of claim 20, wherein said linecard modem and client modem support V.92, V.90 or V.34 compatible modulation.

28. The communication method of claim 20, wherein said linecard indication is generated by said linecard modem.

29. The communication method of claim 28, wherein said linecard indication is a tone above 4 kHz.

30. The method of claim 20 further comprising: receiving a client indication indicative of existence of said client modem in response to said linecard indication.

31. The method of claim 30, wherein said client modem and said linecard modem start handshaking without said client modem dialing a number.

32. The method of claim 31, wherein said linecard modem does not generate an answer tone for said handshaking.

33. The method of claim 20, wherein said client modem dials a number in response to said dial tone, and the method further comprising:

identifying said number as a modem call; and configuring said linecard modem to start handshaking with said client modem without generating an answer tone.

\* \* \* \* \*

UNITED STATES PATENT AND TRADEMARK OFFICE
CERTIFICATE OF CORRECTION

PATENT NO. : 7,082,125 B1  Page 1 of 1
APPLICATION NO. : 09/990059
DATED : July 25, 2006
INVENTOR(S) : Brent et al.

It is certified that error appears in the above-identified patent and that said Letters Patent is hereby corrected as shown below:

In the claims, column 8, line 45, "commination" should be changed to --communication--.

Signed and Sealed this

Thirty-first Day of October, 2006

JON W. DUDAS
*Director of the United States Patent and Trademark Office*